Sept. 27, 1966     J. A. KAROLY ET AL     3,275,249
ENTRANCE NOZZLE FOR FLASHING SUPERHEATED LIQUID
Filed Aug. 20, 1964     3 Sheets-Sheet 1
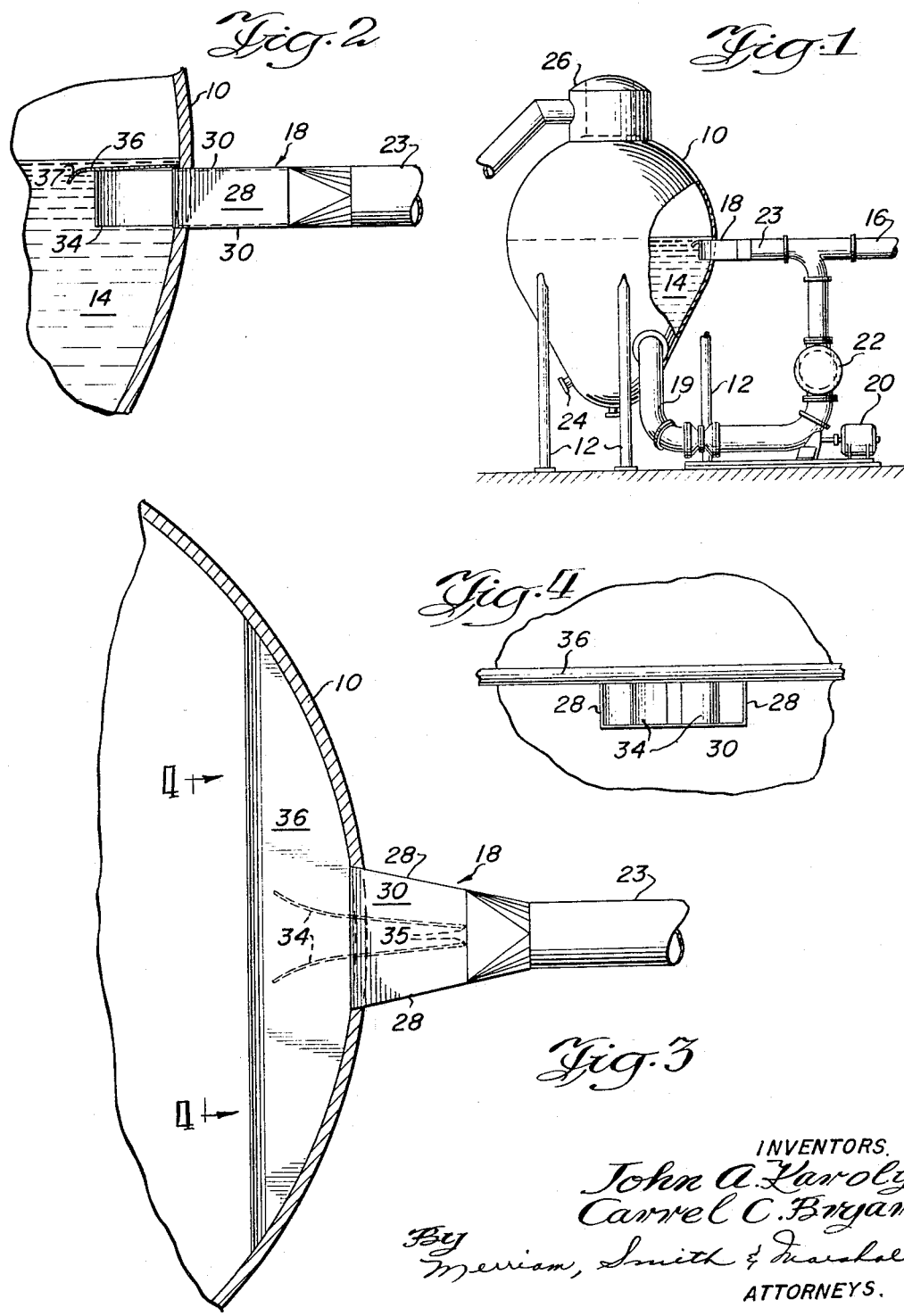
INVENTORS.
John A. Karoly
Carrel C. Bryant
By Merriam, Smith & Marshall
ATTORNEYS.

Sept. 27, 1966     J. A. KAROLY ET AL     3,275,249
ENTRANCE NOZZLE FOR FLASHING SUPERHEATED LIQUID
Filed Aug. 20, 1964     3 Sheets-Sheet 2
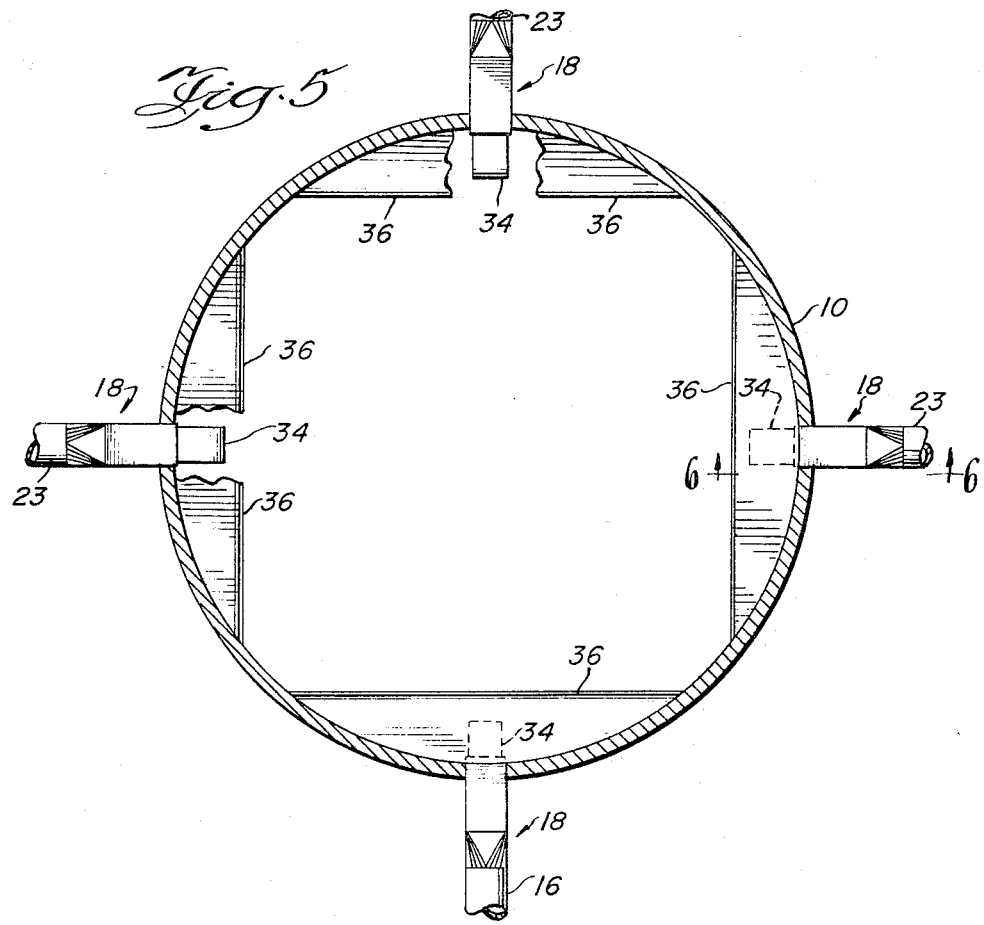
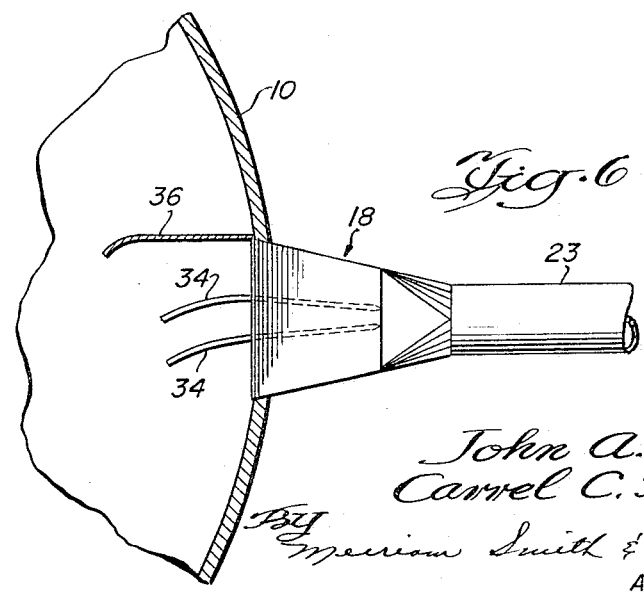
INVENTORS.
John A. Karoly
Carrel C. Bryant
BY Merriam Smith & Marshall
ATTORNEYS.

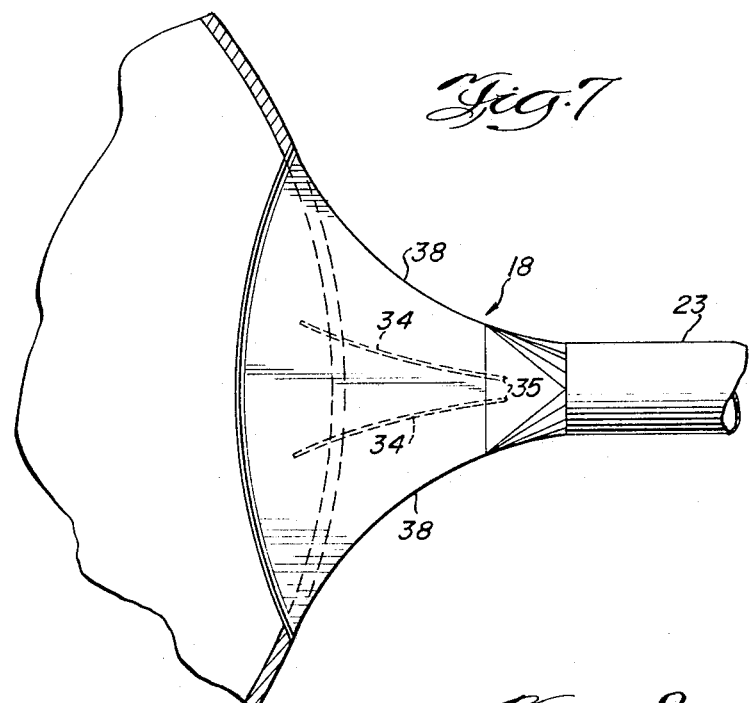
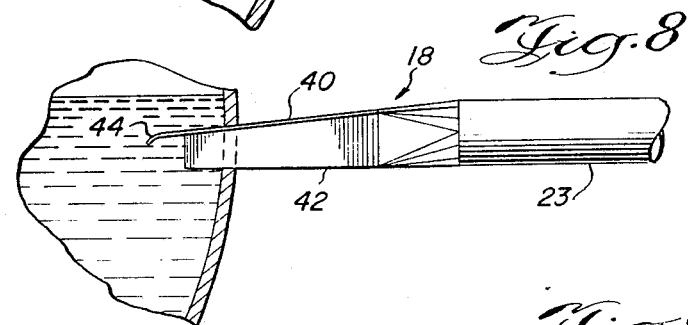
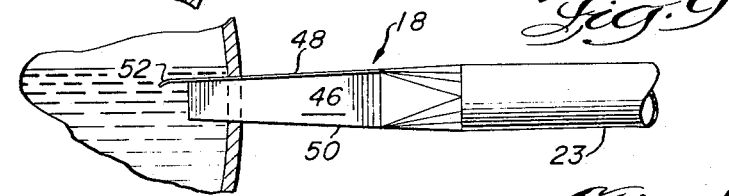
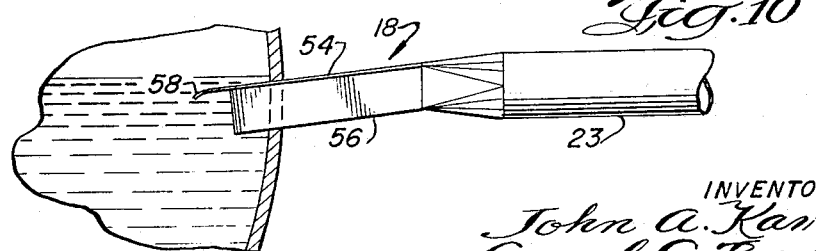

United States Patent Office 3,275,249
Patented Sept. 27, 1966

1

3,275,249
ENTRANCE NOZZLE FOR FLASHING
SUPERHEATED LIQUID
John A. Karoly and Carrel C. Bryant, Chicago, Ill., assignors to Chicago Bridge & Iron Company, Oak Brook (Hinsdale P.O.) Ill., a corporation of Illinois
Filed Aug. 20, 1964, Ser. No. 390,951
6 Claims. (Cl. 239—523)

This invention relates to a nozzle. In its more specific aspect, the invention relates to an inlet nozzle for a process vessel, especially chemical process vessels having a circulation means. Still more specifically, the invention relates to a nozzle for a process vessel wherein turbulence normally results upon introduction to the vessel of fluid undergoing processing which is at a higher temperature and/or pressure than the temperature and/or pressure of the fluid contained in the vessel. Such processing vessels include, for example, process reactors, process crystallizers, process evaporators and the like.

In order to describe the invention in greater detail, the invention is shown as applied to a process crystallizer vessel for illustrative purposes only. It should be understood, however, that the invention is equally applicable to other process vessels such as described above.

Crystallization offers a practical and economical procedure for obtaining concentrated chemical materials in a purified form and in a condition for efficient handling, packaging and storing. In the crystallization process, in order to induce crystallization, a supersaturated solution is fed to the crystallizer vessel. Various types of crystallization equipment are employed in the chemical process industry and are classified, depending upon the means used, to develop supersaturation and to control yield per pass. One of the more important types of crystallizers, from an operational and economical standpoint, is one wherein supersaturation is provided by adiabatic evaporation and cooling. Generally, the crystallizer vessel is provided with a recirculation means whereby fluid from the vessel is recirculated with or without fresh feed. The fresh feed usually enters the unit via the recirculation line, and the combined material or fluid is passed to the crystallizer vessel. In the operation of this type, the fluid introduced to the crystallizer is at a higher temperature and pressure than the liquid in the vessel. The fluid is introduced to the vessel through an inlet which is located adjacent or in the vicinity of the normal liquid level in order that the solution can be fed into the crystallizer in such a way that it reaches the surface of the liquid therein. Under the operating conditions employed for a given crystallization operation, the solution will, by means of equilibrium flash vaporization, spontaneously adiabatically cool to the boiling temperature corresponding to the pressure existing in the vessel and reach equilibrium with respect to the vapor in the crystallizer. The resultant cooling will produce crystallization.

This type of crystallization has found wide application in a number of installations and for a number of materials. In a conventional crystallizer, the inlet means usually comprises a pipe or tube entering the vessel, and may protrude into the vessel. The solution is heated externally of the crystallizer, and when fed to the crystallizer via a suitable pipeline under pressure, there is a build-up of both temperature and pressure in the confined pipe inlet. When the hot solution enters the vessel, there is an instantaneous release of temperature and pressure which causes considerable turbulence. The hot supersaturated solution boils and flashes, and a substantial amount of liquid is vaporized. This turbulence and vaporization carries the dissolved material with it, and salt

2 from the entrained liquor forms and gradually accumulates on the irregularities in the surface in the vapor section of the crystallizer vessels thereby impeding the vapor flow in this section. Moreover, due to spontaneous and localized vapor release, large crystals build up on the interior surface of the vessel and eventually break off and fall into the lower portion of the vessel. These large crystals might not only clog the exit lines, but further adversely affect uniformity of crystallization. In addition, proportional with the degree of turbulence, a substantial amount of dissolved material entrained in the vapor escapes from the unit through the vapor pipe thereby resulting in considerable loss of material. The salt build-up requires that the crystallizer be shut down periodically in order to carry out cleaning operations for removing the salt build-up with hot water.

In accordance with the present invention, the foregoing disadvantages are minimized by providing an inlet nozzle opening to the interior of the crystallizer. The nozzle is provided with a wall section flared outwardly or diverging in the direction of the flow thereby substantially increasing the cross-sectional area of the opening to the crystallizer. A plurality of diverging vanes or baffles are arranged in the nozzle and extend longitudinally thereof and desirably have arcuate ends terminating within the crystallizer. The vanes serve as directional means to direct or guide the flow of the solution entering the vessel. A horizontally disposed plate member depending from the interior wall of the crystallizer is arranged adjacent and above the opening of the nozzle and above the vanes. By reason of our invention, the area of flow channel is increased, and the hot liquid entering the vessel, or a combination of hot liquid and vapor, is diverted into a number of compartments defined by the nozzle and the vanes. There is a decrease in the entrance velocity and also a decrease in the pressure with an accompanying volumetric flow rate increase. As a result turbulence normally caused is diminished substantially, and consequently the salt accumulation on the wall of the vessel is inhibited and eliminated or minimized.

In order to describe the invention in greater detail, reference is now made to the accompanying drawings illustrating a preferred embodiment of our invention as applied to a crystallizer vessel for illustrative purposes only, and several modifications thereof.

FIGURE 1 is an elevational view illustrative of a crystallizer and partly fragmentary to show the details of the present invention;

FIGURE 2 is a longitudinal sectional view showing in detail the elements of the invention;

FIGURE 3 is a plan view of FIGURE 2;

FIGURE 4 is an elevational view on line 4—4 of FIGURE 3;

FIGURE 5 is a plan view partly fragmentary of a crystallizer, such as the type illustrated in FIGURE 1, showing four nozzle inlets constructed in accordance with the present invention;

FIGURE 6 is an elevational view on line 6—6 of FIGURE 5;

FIGURE 7 is a plan view of a modified form of the nozzle inlet falling within the scope of the invention; and FIGURES 8, 9 and 10 are elevational views of further modifications of the nozzle inlet of the invention.

Referring to the drawings wherein like reference numerals designate similar parts throughout the various views, there is shown a crystallizer vessel 10, as an illustrative process vessel, which in normal practice would constitute a vessel of a crystallization section of a multiple stage crystallization system (not shown). Suitable support columns 12, or other structural arrangements, are used for supporting the crystallizer vessel 10. In addition, it should be understood that there is employed auxiliary equipment (not shown) which is used in the recovery of the crystals from the magma discharged from the crystallization vessel. These vessels are large capacity units and may range from about 50,000 to 2,000,000 gallons producing crystal yields from 50 to 2,000 tons per day, although crystallizers of a larger or smaller size may be employed.

The crystallizer vessel may be sphere-like or conispherical as illustrated. The crystallizer vessel 10 contains the solution 14 undergoing crystallization, which might occupy about one-half the capacity of the tank, or with a conispherical vessel, the vessel is filled with solution approximately to the equator belt. However, the level of the solution in the processing vessel may vary depending on a number of factors, for example, the characteristics of the solution undergoing treatment. The zone within the vessel above the surface of solution provides a vapor release area. During equilibrium flash vaporization, liquor is entrained in the vapors, and salt dissolved in the entrained liquor is deposited on the internal walls of the vessel. As explained above, the salt deposition will render the process inoperative and adversely effect uniformity of crystallization.

The heated solution is led to the vessel by means of inlet line 16 and nozzle 18, to be discussed in greater detail hereinbelow, from a suitable source (not shown). There is provided a circulation system having interconnected piping and comprising a fluid outlet 19, a recirculation pump 20, a conventional indirect heat exchange element 22, and piping inlet 23 and terminating at nozzle 18. The location of the nozzle 18 is such as to insure that the incoming solution is brought to the surface of the vessel at the interface of the vapor-liquid area to permit the solution to flash to equilibrium with the vapor in the crystallizer, and the fluid is introduced into the crystallization zone through the nozzle. The crystal outlet 24 is located near the bottom of the crystallizer vessel 10. Vapors from the vapor zone of the crystallizer vessel 10 are drawn through a catchall type separator 26 and are used to supply heat to the heating element of the recirculation system for the next crystallizer vessel in a multiple stage crystallization system (not shown).

Referring now in greater detail to the nozzle member of our invention, there is shown nozzle 18 connected to piping inlet 23 by any suitable means such as a welded or flanged connection. The nozzle 18 is provided with vertical wall members 28 diverging in the direction of the flow (see FIGURE 3), and parallel horizontal wall members 30 (see FIGURE 2), intercepting with the diverging wall members thereby forming a substantially rectangular cross-section. The nozzle opening to the vessel is therefore rectangular having its longitudinal axis horizontally disposed, as illustrated in FIGURES 2 and 4. The rectangular nozzle having the rectangular opening is particularly advantageous, for, as described above, the nozzle opening to the crystallizer vessel is approximately adjacent to the level of solution in the vessel or at about the equator belt of the vessel. The rectangular opening, therefore, renders a substantially uniform depth in entrance, which is relatively small in comparison with the overall volume entrance provided by the rectangular opening. The nozzle 18 may terminate substantially flush with the wall of the crystallizer vessel 10, or where desired, the wall members of the nozzle may protrude into the vessel, for example, a depth from six to twelve inches. This would depend upon such factors as the type of solution being treated and the conditions for the treatment, and can readily be determined beforehand by those skilled in the art.

It should be understood, however, that the nozzle may be generally conical, semiconical, parabolic or frustoconical, as might well be envisioned by reference to FIGURE 3. A conical nozzle, however, would provide for a substantially circular opening to the vessel, and therefore would not provide the same uniformity of depth in the entrance opening as the rectangular nozzle. However, the cross-sectional configuration desired will depend upon the system employed.

A plurality of vanes 34 are arranged in said nozzle 18 and extend longitudinally thereof. The vanes 34 are arranged in a diverging manner in the direction of the flow, and the vanes may terminate at the opening of the nozzle to the side wall of the crystallizer vessel. Where desired, the vanes may protrude into the crystallizer vessel beyond the opening of the nozzle to the vessel and/or beyond the terminus of the nozzle. For example, the vanes may protrude into the crystallizer vessel by as much as from six inches to thirty inches, but this will depend upon such factors as the solution being treated and the process conditions for crystallization, which are readily determined by those skilled in the art. As illustrated in FIGURES 2 and 3, the vanes 34 are vertically disposed, and would be submerged by the liquid solution undergoing crystallization. Where desired, however, and in the modification discussed below, the vanes 34 might be horizontally disposed.

The vanes 34 extend from within the nozzle 18 and inwardly from the inlet end of the nozzle. That is, the vanes do not extend the full length of the nozzle to the inlet end of the nozzle because this would cause unnecessary restriction of the flow of fluid and add substantially to the pumping cost. Therefore, the vanes are set in the nozzle at a point where restriction of flow of the entering solution would not be increased. Where desired, the leading or upstream edges of the vanes, that is, the edge which first contacts the oncoming fluid, are tapered at 35 to decrease the resistance to flow of the entering fluid.

The thickness of the vanes may range from about one-eighth inch to three-fourths inch, but may be of different dimensions, and the number of vanes employed will vary, depending upon the operating conditions.

A plate member 36 depends from the interior wall of the vessel, and is arranged above the opening of the nozzle to the vessel. As illustrated in FIGURE 2, plate 36 depends obliquely downwardly from the interior wall of the vessel, and is arranged above the vanes and extends transversely with respect to the vanes. The free end of the plate member is desirably provided with a downwardly arcuate terminus 37.

It will be observed that by reason of our invention the heated liquid, as it is fed to the crystallizer vessel through nozzle 18, is diverted into a number of compartments defined by the diverging walls 28 of the nozzle and the vanes 34. The diverging walls of the nozzle decrease the entrance velocity, and, therefore, decrease the pressure, and the vanes split the flow of fluid and direct it in a number of directions. As explained above, the vanes desirably extend into the crystallizer vessel to enhance the change in direction of the fluid and to cover a larger area of the vessel. Further, the arcuate ends of the vanes direct a substantial portion of the fluid toward the sides of the vessel without causing too great a disturbance in the flow pattern. Plate member 36 serves as a hood in that it confines the fluid until it reaches further into the interior of the vessel. That is, without plate member 36, there would be a release of energy almost immediately upon entering the crystallizer vessel. The arcuate terminus 37 of the plate member 36 provides a final downward pitch so that the entering feed material will carry further into the center of the vessel before rising. This further inhibits spraying splashing close to the interior walls of the crystallizer vessel 10. Also, plate member 36 depends obliquely from the interior wall of the vessel and sufficiently below the normal liquid level so that solute will continuously wash off from the plate member, rather than accumulate on the top surface thereof.

In crystallizer vessels such as of a size previously described, there may be provided a multiple of inlets, and the nozzle structure of the invention renders itself to this arrangement as illustrated in FIGURE 5. There is illustrated four nozzles 18 connected to inlet lines 16 and opening to the crystallizer vessel 10, but it should be understood that this embodiment of the invention is equally applicable with any number of nozzles, such as two, three and five or more. The nozzles desirably are spaced equally apart around the circumference of the crystallizer vessel. Further in this embodiment, the vanes 34 extend longitudinally of the nozzle in a horizontal plane rather than in a vertical plane. The plate member 36 is disposed adjacent the opening and above the vanes as described above. Where desired, the plate member 36 may be annular or frustoconical, thereby forming a continuous plate member. By reason of this arrangement, the fluid is directed simultaneously from each of the nozzles toward the center portion of the crystallizer vessel. The flow is diverted and fluid spread as described above, but the release of heat and energy takes place primarily near the center section of the crystallizer vessel and away from the interior wall, thereby resulting in a geyser-like effect. Because the vapor space, as defined by the crystallizer vessel, is substantially hemispherical, the center of the vessel is the furthest point from the wall, and, consequently, the likelihood of solute splashing against the wall and forming a salt deposit thereon is minimized.

It should be understood that a nozzle, especially one employing the vanes in a horizontal plane, may be located elsewhere than at the equator belt, and may be above or below the liquid level of the vessel depending upon the effect desired.

FIGURE 7 illustrates a modified form of the nozzle 18 connected to the piping inlet 23 and opening to the interior of the crystallizer vessel 10. In this embodiment of the invention, the nozzle 18 is provided with arcuate walls 38 diverging in the direction of flow. This creates a fanlike effect rendering smooth flow lines without interruption so as to sweep out the fluid and to cover a wider area of flow. In this embodiment, the nozzle may have a rectangular configuration or a conical or other configuration, as described above.

Still further modifications of the invention are illustrated in FIGURES 8, 9 and 10 showing elevational views of the nozzle. In FIGURE 8, the top wall 40 is sloped or inclined downwardly with respect to the substantially horizontal bottom wall 42. Also, wall 40, built integrally with the nozzle, extends beyond the nozzle opening and is provided with an arcuate terminus 44, thereby serving as a hood in substantially the same manner as plate 36 in FIGURE 2, and the sloped wall provides the deflecting action. In FIGURE 9, the vertical walls 46 diverge in the manner as described above, and the intercepting horizontal walls 48 and 50 incline toward the wall of the crystallizer vessel thereby reducing the height or diameter of the opening of the nozzle to the crystallizer vessel. The slope of the horizontal walls and the arcuate terminus 52 serves the same function as described for the embodiment of FIGURE 8. According to the modification shown in FIGURE 10, nozzle 18 depends obliquely from the piping inlet 23 and, therefore, extends to the wall of the crystallizer vessel 10 at an oblique angle. Horizontal wall 54, having the arcuate terminus 58, is deflected downwardly in combination with a substantially parallel bottom wall 56, thereby providing the deflecting action. It will be observed that with respect to the modifications shown in FIGURES 8, 9 and 10 that the nozzle protrudes beyond the interior wall surface of the crystallizer vessel. Where desired, however, the nozzle may terminate at the wall of the crystallizer vessel. Also, the nozzle in each of these embodiments is provided with a vane (not shown) as described above, which vane may terminate within the nozzle in the case where the nozzle protrudes beyond the interior wall surface of the crystallizer vessel as shown in the figures, or which may terminate beyond the end of the nozzle, such as described in the embodiment of FIGURES 2 and 3.

What is claimed is:

1. In a process vessel having an inlet line for introducing hot fluid to said process vessel operated under a lower pressure and temperature than said fluid, the improvement which comprises:
   (1) a nozzle extending from said inlet line and communicating therewith opening to the interior of said vessel, said nozzle having vertical wall sections diverging in the direction of the flow and spaced horizontal wall sections substantially normal to said vertical wall sections thereby forming a rectangular opening in said vessel;
   (2) a plurality of vanes extending longitudinally of said nozzle and having arcuate ends terminating within said vessel and having their leading edges tapered, said vanes diverging in the direction of the flow; and
   (3) a plate member depending obliquely from the interior wall of said vessel above said vanes and adjacent the opening of said nozzle and having an arcuate terminus, said plate member extending beyond the terminus of said nozzle.

2. In a process vessel according to claim 1 wherein said vertical wall sections are tapered along at least one plane whereby at least one horizontal wall section is inclined toward the process vessel.

3. In a process vessel according to claim 1 wherein said horizontal wall sections are substantially parallel.

4. In a process vessel having an inlet line for introducing hot fluid to said process vessel operated under a lower pressure and temperature than said fluid, the improvement which comprises:
   (1) a nozzle extending from said inlet line and communicating therewith opening to the interior of said vessel, said nozzle having arcuate vertical wall sections diverging in the direction of flow;
   (2) a plurality of vanes extending longitudinally of said nozzle terminating within said vessel and diverging in the direction of flow; and
   (3) a plate member arranged above and adjacent the opening of said nozzle and extending beyond the terminus of said nozzle.

5. In a process vessel having an inlet line for introducing hot fluid to said process vessel operated under a lower pressure and temperature than said fluid, the improvement which comprises:
   (1) a nozzle extending from said inlet line and communicating therewith opening to the interior of said vessel, said nozzle having arcuate vertical wall sections diverging in the direction of the flow and spaced horizontal wall sections substantially normal to said vertical wall sections thereby forming a rectangular opening in said vessel;
   (2) a plurality of vanes extending longitudinally of said nozzle and having arcuate ends terminating within said vessel and having their leading edges tapered, said vanes diverging in the direction of the flow; and
   (3) a plate member depending obliquely from the interior wall of said vessel above said vanes and adjacent the opening of said nozzle and having an arcuatae terminus, said plate member extending beyond the terminus of said nozzle.

6. In a process vessel having an inlet line for introducing hot fluid to said process vessel operated under a lower pressure and temperature than said fluid, the improvement which comprises:
   (1) a nozzle extending from said inlet line and communicating therewith opening to the interior of said vessel, said nozzle having arcuate vertical wall sections diverging in the direction of the flow and spaced horizontal wall sections substantially normal to said vertical wall sections thereby forming a rectangular opening in said vessel;

(2) a plurality of vanes extending longitudinally of said nozzle and having arcuate ends terminating within said vessel and having their leading edges tapered, said vanes diverging in the direction of the flow; and (3) the top wall section of said spaced horizontal wall sections extending beyond the terminus of said nozzle above said vanes and having an arcuate terminus.

References Cited by the Examiner

UNITED STATES PATENTS

| | | | |
|---|---|---|---|
| 1,888,214 | 11/1932 | Bogstrand | 239—552 |
| 2,121,401 | 6/1938 | Hollis | 239—515 |
| 2,154,731 | 4/1939 | Crowley | 239—502 |
| 2,609,240 | 9/1952 | Faulkner et al. | 239—553 |
| 2,635,642 | 4/1953 | Hobbs et al. | 239—522 |
| 2,864,406 | 12/1958 | Schewel | 239—590 |

M. HENSON WOOD, JR., *Primary Examiner.*

R. S. STROBEL, *Assistant Examiner.*